Dec. 4, 1934.   A. L. WALBORN   1,982,773
SPREADER ATTACHMENT FOR TRUCKS
Filed June 6, 1933   3 Sheets-Sheet 1
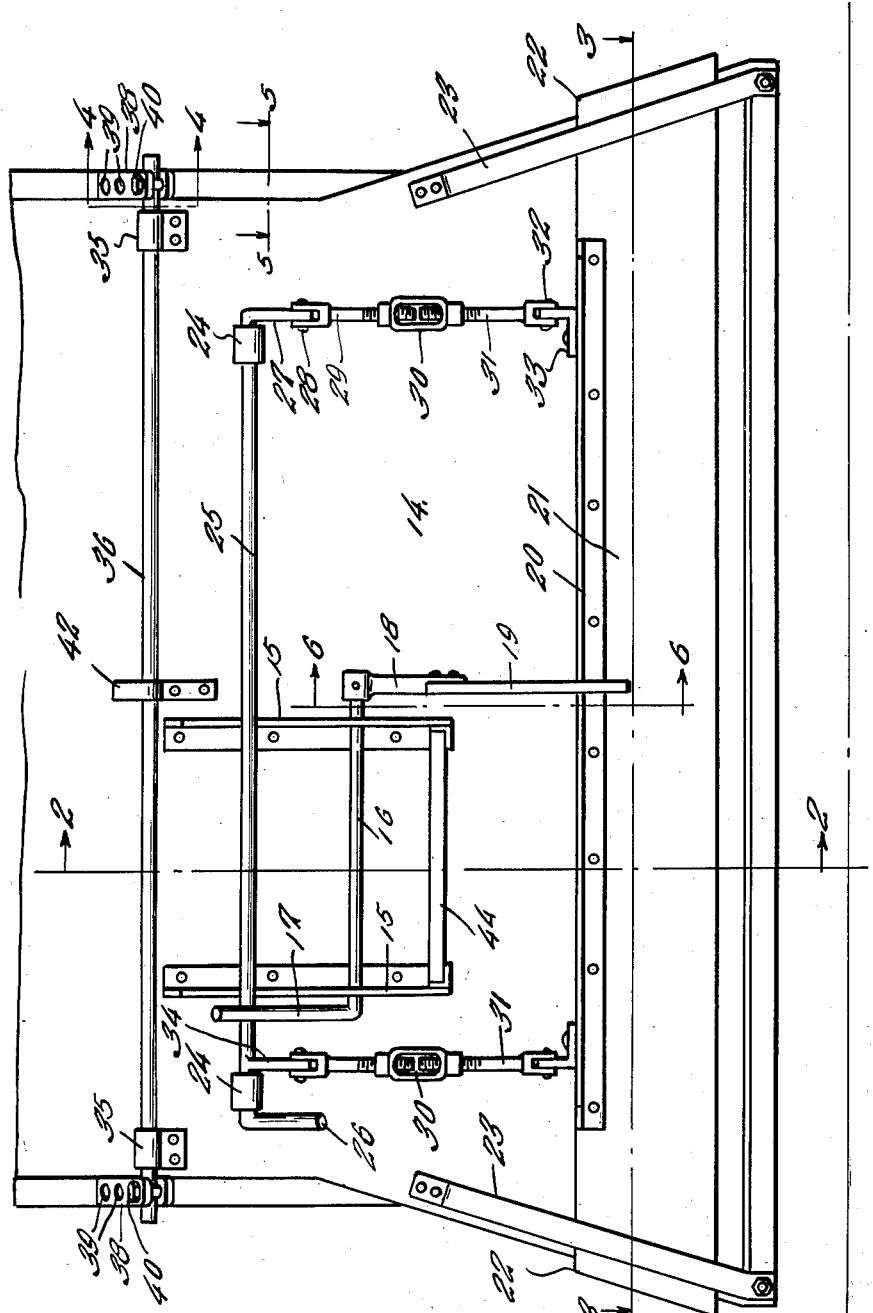
Inventor
Arthur L. Walborn
By Clarence A. O'Brien
Attorney Dec. 4, 1934.  A. L. WALBORN  1,982,773
SPREADER ATTACHMENT FOR TRUCKS
Filed June 6, 1933   3 Sheets-Sheet 2
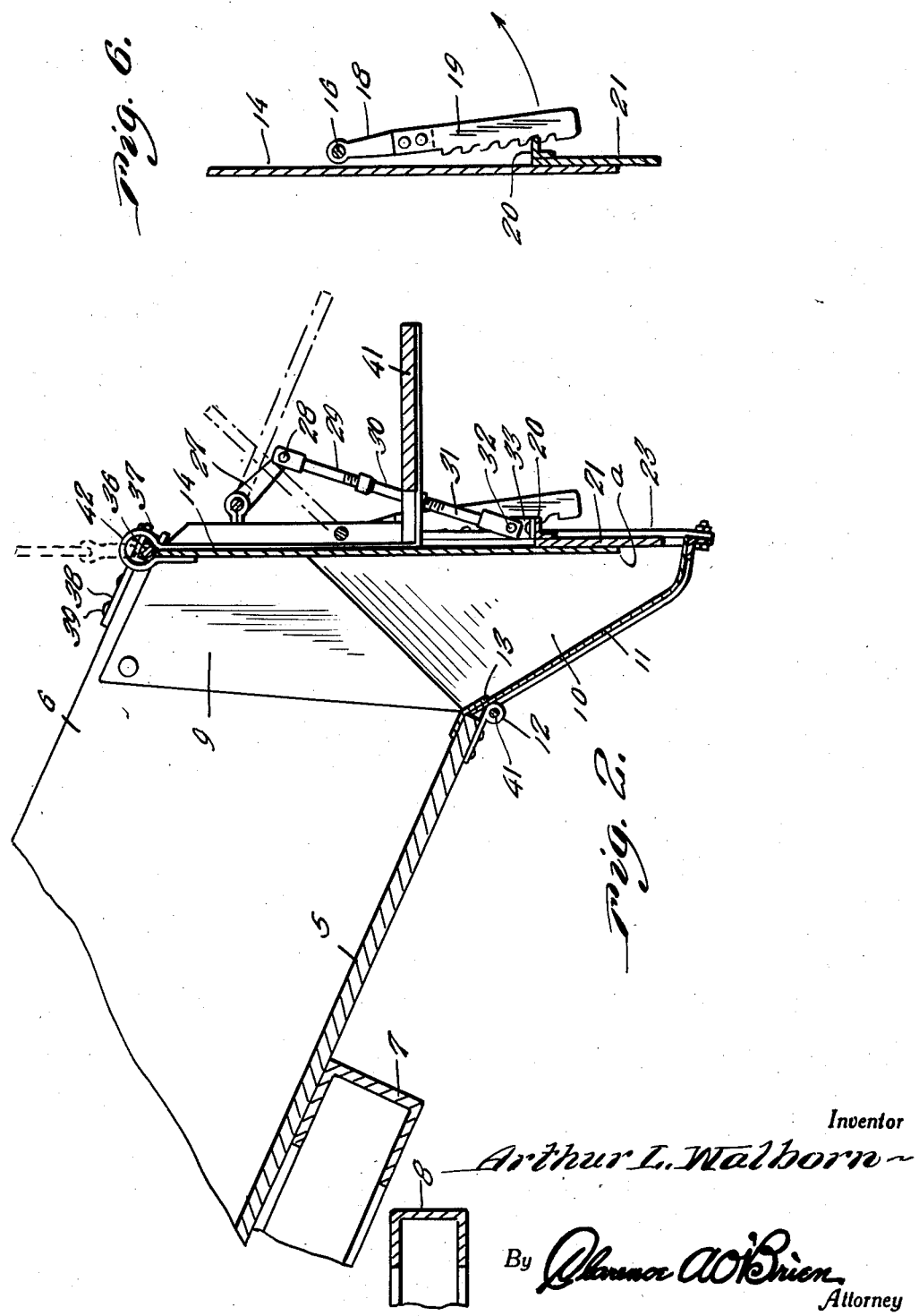
Inventor
Arthur L. Walborn
By Clarence A. O'Brien
Attorney

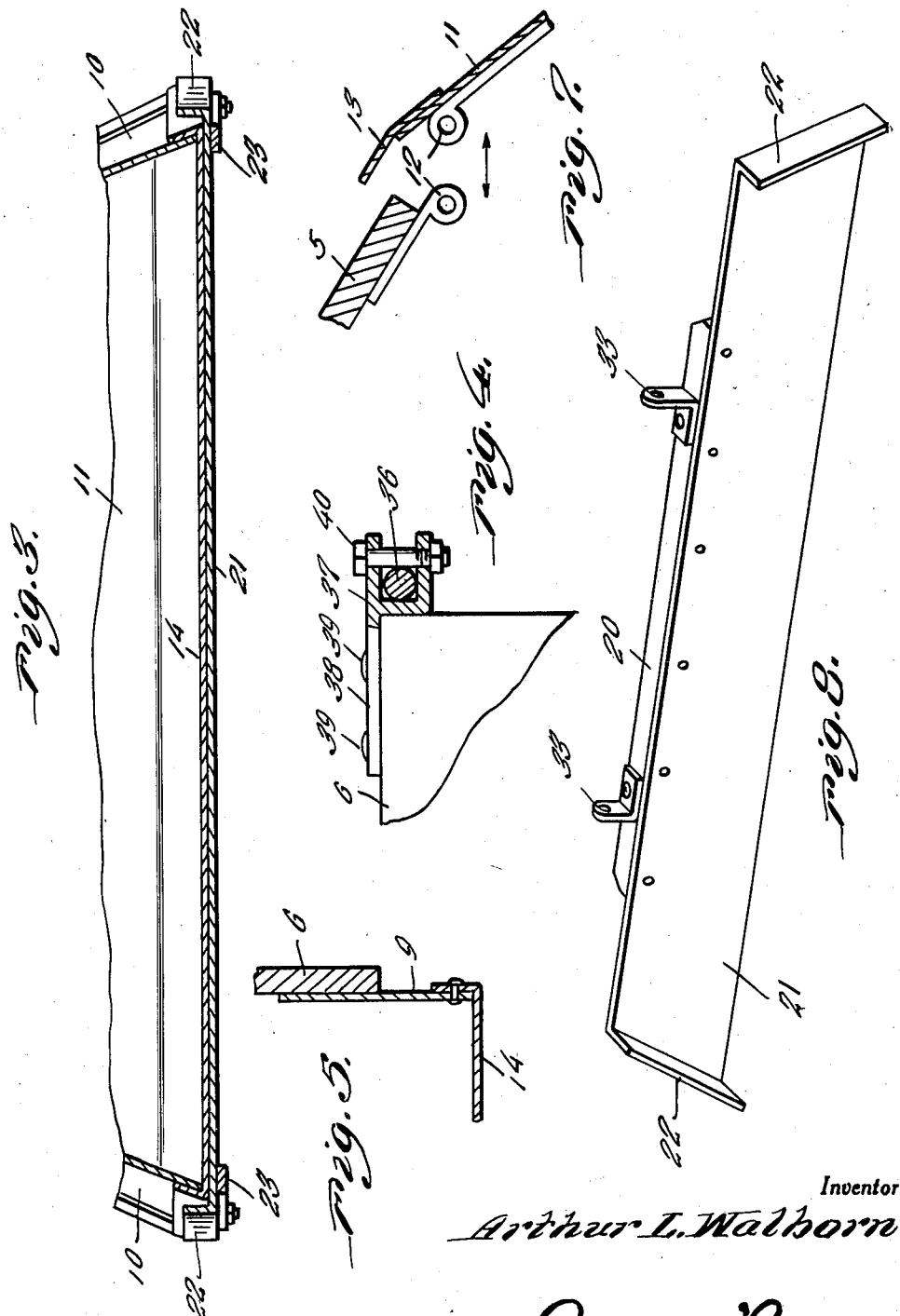

Patented Dec. 4, 1934

1,982,773

UNITED STATES PATENT OFFICE 1,982,773

SPREADER ATTACHMENT FOR TRUCKS

Arthur L. Walborn, Reading, Pa.

Application June 6, 1933, Serial No. 674,577

2 Claims. (Cl. 275—2)

This invention appertains to new and useful improvements in stone spreading attachments for trucks and the principal object of the present invention is to provide a spreader attachment which can be readily applied and removed, as required.

Another important object of the present invention is to provide a spreader attachment for trucks which can be conveniently operated by a man supported on the attachment.

Still another important object of the present invention is to provide a spreader attachment which can be readily adjusted and which will retain its adjusted position without likelihood of accidental self-adjusting.

Other important objects and advantages of the invention will become apparent to the reader of the following specification.

In the drawings:—

Figure 1 represents a rear elevational view showing the spreader attachment.

Figure 2 represents a fragmentary vertical sectional view taken substantially on line 2—2 of Figure 1.

Figure 3 represents a fragmentary sectional view taken substantially on line 3—3 of Figure 1.

Figure 4 represents a detailed sectional view taken substantially on line 4—4 of Figure 1.

Figure 5 represents a fragmentary horizontal sectional view taken substantially on line 5—5 of Figure 1.

Figure 6 represents a fragmentary vertical sectional view taken substantially on line 6—6 of Figure 1.

Figure 7 represents a fragmentary vertical sectional view showing the connection broken between the truck bottom and the bottom of the spreader.

Figure 8 represents a perspective view of the spreader gate.

Referring to the drawings wherein like numerals designate like parts, it can be seen in Figure 2, that numeral 5 represents the bottom of the truck, while numeral 6 represents one of the side walls, while numeral 7 represents the supporting frame of the truck body. Numeral 8 represents the supporting chassis of the vehicle.

In carrying out the present invention, the spreader involves a pair of side walls 9—9 which are flared at their lower ends and taper downwardly, as denoted by numeral 10, to provide the end walls for the hopper structure of the spreader which includes the bottom wall 11. As is clearly shown in Figure 2, the bottom wall 11 is hingedly connected, as at 12, to the bottom 5 of the truck and an extending plate or flange 13 on the spreader bottom 11 overlaps the bottom of the truck, as in the manner clearly shown in Figure 2, and more clearly shown in Figure 7.

The back wall of the spreader is denoted by numeral 14 and extends between the walls 9—9 and also connects the extremities of the side walls 10—10, but terminates at the point $a$, a substantial distance above the lower end of the bottom 11, which bottom, at this point, is curved to almost a horizontal plane.

As is clearly shown in Figure 1, numerals 15—15 represent a pair of angle irons secured to the back side of the back wall 14 and through the outstanding flanges of these angle bars is journaled the shaft 16 which is bent laterally at one end to provide the handle 17, while its opposite end is provided with a lever 18 to which the ratchet bar 19 is connected and this ratchet bar normally assumes a gravitated position against the outstanding flange of the angle bar which is secured along the top edge of the gate 21. This gate is operative over the opening between the lower end of the spreader bottom 11 and the lower edge of the wall 14 which terminates at $a$. The ends of this gate 21 are bent laterally, as at 22, to engage the outer sides of the side walls 10 and thus prevent any longitudinal displacement of the gate and the end portions of this gate operate in the guides 23 which prevent any backward displacement of the gate.

A pair of outstanding bearing structures 24—24 on the back wall 14 have the elongated shaft 25 journalled therethrough. One end of this shaft is bent laterally to provide a handle 26, while the other end is bent laterally to provide the lever 27 which is pivotally connected as at 28 to one section 29 of a turn buckle structure 30, while the other section 31 of this turn buckle structure is pivotally connected as at 32 to the lug 33 on the angle bars 20. Adjacent the opposite end of this shaft 25 is an arm 34 which is likewise connected by a turn buckle to the angle iron 20, as is clearly shown in Figure 1.

A pair of barrel structures 35—35 at the upper edge of the back wall 14 have the end portions of the elongated rod 36 disposed therethrough and the end portions of this rod are disposed into the yokes 37—37 which are connected by the shanks 38 and screws 39 to the side walls 6 of the truck body. Removable bolts 40 serve to prevent displacement of the ends of this bar 36 and consequently the entire spreader attachment which is only otherwise secured to the truck body by the hinged connection 12 involving a pin or pins 41 which can be removed to permit absolute removal of the spreader from the truck body.

In removing the spreader attachment from the truck body, suitable tackle is engaged with the enlarged loop 42 at the upper edge of back wall 14 and by first removing the hinge pin 41 and subsequently removing the bolts 40, the entire spreader can be very easily removed from the truck and can with an equal amount of ease be applied to the truck body.

Obviously, the handle 26 serves to adjust the gate 21 and the ratchet rack bar 19 serves to retain the gate plate in adjusted position and if it is desired that the width of the spread be limited, suitable filler plates can be dumped on the bottom 11 of the spreader to fill in part of the space below the lower edge of the wall 14.

A seat or platform upon which a person can sit or stand is secured to the angle bars 15—15 and denoted by numeral 44.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A spreader attachment for trucks comprising a hopper, said hopper having an outlet in the bottom thereof, a valve for the outlet, a pair of angle bars secured to the outside of the hopper in vertical, parallel relation to each other, a shaft journaled through the outstanding flanges of the angle bars, a hand lever at one end of the shaft, a lateral arm at the opposite end of the shaft, a projection on the valve, and a rack carried by the arm and engaged with the said projection.

2. A spreader attachment for trucks comprising a hopper, said hopper having an outlet in the bottom thereof, a valve for the outlet, a shaft rotatably supported on the said hopper and provided with a hand lever at one end thereof, a lever extending laterally from the said shaft, a projection on the valve, and a ratchet bar suitably connected at one end to the last mentioned lever and having its teeth engaged with the projection on the valve.

ARTHUR L. WALBORN.